United States Patent
Jang et al.

(10) Patent No.: US 8,505,051 B2
(45) Date of Patent: Aug. 6, 2013

(54) METHOD FOR OUTPUTTING CONTENT INFORMATION AND DISPLAY SYSTEM ENABLING THE METHOD

(75) Inventors: Sae Hun Jang, Seoul (KR); Ji Hea Kim, Seoul (KR); Jae Hee Shim, Seoul (KR); Uni Young Kim, Seoul (KR); Hyung Nam Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 12/627,504

(22) Filed: Nov. 30, 2009

(65) Prior Publication Data

US 2010/0138866 A1 Jun. 3, 2010

(30) Foreign Application Priority Data

Dec. 1, 2008 (KR) .......................... 10-2008-0120605

(51) Int. Cl.
*H04N 5/445* (2006.01)
*G06F 3/00* (2006.01)
*G06F 13/00* (2006.01)

(52) U.S. Cl.
USPC ................. 725/45; 725/40; 725/43; 725/44; 725/46; 725/47; 725/50; 725/52; 725/53; 725/58; 725/61

(58) Field of Classification Search
USPC ................. 725/40, 43–47, 50, 52–53, 58, 61
See application file for complete search history.

(56) References Cited

U.S. PATENT DOCUMENTS

| | | | | |
|---|---|---|---|---|
| 6,246,442 B1 * | 6/2001 | Harada et al. | ................. | 348/569 |
| 7,669,214 B2 * | 2/2010 | Ozaki | .............. | 725/44 |
| 2002/0174430 A1 * | 11/2002 | Ellis et al. | ........ | 725/46 |
| 2003/0046699 A1 * | 3/2003 | Nonomura et al. | ........ | 725/58 |
| 2003/0190150 A1 * | 10/2003 | Kawasaki et al. | ........ | 386/83 |
| 2004/0237108 A1 * | 11/2004 | Drazin et al. | .......... | 725/56 |
| 2005/0235316 A1 * | 10/2005 | Ahmad-Taylor | ........ | 725/44 |
| 2006/0120624 A1 * | 6/2006 | Jojic et al. | ........ | 382/284 |
| 2006/0253867 A1 * | 11/2006 | Potrebic et al. | ........ | 725/50 |
| 2008/0046935 A1 * | 2/2008 | Krakirian | ........ | 725/87 |
| 2009/0165048 A1 * | 6/2009 | Nishimura | ........ | 725/39 |
| 2009/0249398 A1 * | 10/2009 | Cirrincione et al. | ........ | 725/43 |
| 2010/0131987 A1 * | 5/2010 | Kent et al. | ........ | 725/55 |
| 2010/0175090 A1 * | 7/2010 | Cordray | ........ | 725/58 |
| 2010/0262995 A1 * | 10/2010 | Woods et al. | ........ | 725/40 |

FOREIGN PATENT DOCUMENTS

WO WO 2008/127737 A1 10/2008

OTHER PUBLICATIONS

European Search Report dated Aug. 2, 2011 issued in Application 09 01 4904.

* cited by examiner

*Primary Examiner* — Jason Salce
(74) *Attorney, Agent, or Firm* — KED & Associates, LLP

(57) ABSTRACT

A method for outputting content information and a display apparatus enabling the same are disclosed. The method for outputting contents information of a display apparatus includes identifying whether predetermined contents are series or single, generating a content information display object according to the result of the identification, and outputting the content information display object in a display screen, wherein a content information display object corresponding to the series contents is different from a content information display object corresponding to the single contents.

10 Claims, 7 Drawing Sheets

METHOD FOR OUTPUTTING CONTENT INFORMATION AND DISPLAY SYSTEM ENABLING THE METHOD

CROSS REFERENCE TO RELATED APPLICATION

This application claims the benefit of the Patent Korean Application No. 10-2008-0120605, filed on Dec. 1, 2008, which is hereby incorporated by reference as if fully set forth herein.

BACKGROUND OF THE DISCLOSURE

1. Field of the Disclosure

The present invention relates to a method for outputting content information of a display system and a display system enabling the method, more particularly, to a method for outputting content information that is able to determine whether contents series of episodes or a single episode and to generate and output a content information display object based on the result of the identification, and a display system enabling the method.

2. Discussion of the Related Art

Conventional display systems output contents produced by broadcasting stations via frequency transmission media such as a terrestrial, cable and satellite broadcasting. Users view the contents via receivers capable of receiving the transmission media.

In recent, digital broadcasting technology has been developed based on digital technology and used commonly, replacing the conventional analog broadcasting technology. Users may be provided with various kinds of content services, for example, real-time broadcasting, contents on demands (CoD), games and news via usage of internet networks connected houses as well as conventional radio frequency and wire cable media.

An example of content services using such the internet network may be an internet protocol television (IPTV). This IPTV transmits various information services, video contents and broadcastings to receivers of users by using the interne networks. The internet networks may be represented as optical cables, coaxial cables and FTTH (Fiber To The Home), telephone, wireless networks and other kinds based on internet protocols (IP)

In case of the service using such the internet network, interactive systems may be provided in contrast to the conventional terrestrial broadcastings and users can view contents desired to view at a convenient time.

SUMMARY OF THE DISCLOSURE

Accordingly, the present invention is directed to a method for outputting content information of a display system and the display system.

An object of the present invention is to provide a method for outputting content information that is able to output series contents distinguished from single contents in order to make a user distinguish series contents from single contents when outputting series contents, and a display system enabling the method.

Another object of the present invention is to provide a method for outputting content information that is able to increase and output a region of a content information display object according to the number of series in order to make the user select proper one of the series contents in consideration of his/her situations conveniently.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for outputting contents information of a display system includes identifying whether predetermined contents are series or single; generating a content information display object according to the result of the identification; and outputting the content information display object in a display screen, wherein a content information display object corresponding to the series contents is different from a content information display object corresponding to the single contents.

In another aspect of the present invention, a display system includes a controller identifying whether predetermined contents are series or single, the controller generating a content information display object according to the result of the identification; a display outputting the content information display object in a screen, wherein a content information display object corresponding to the series contents is different from a content information display object corresponding to the single contents.

In a further aspect of the present invention, a method for outputting contents information of a display system includes inputting a command to display a contents list; and displaying a single content information display object showing single contents and a series content information display object showing series contents in a screen, wherein the series content information display object has a value of the depth.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Figure 1:
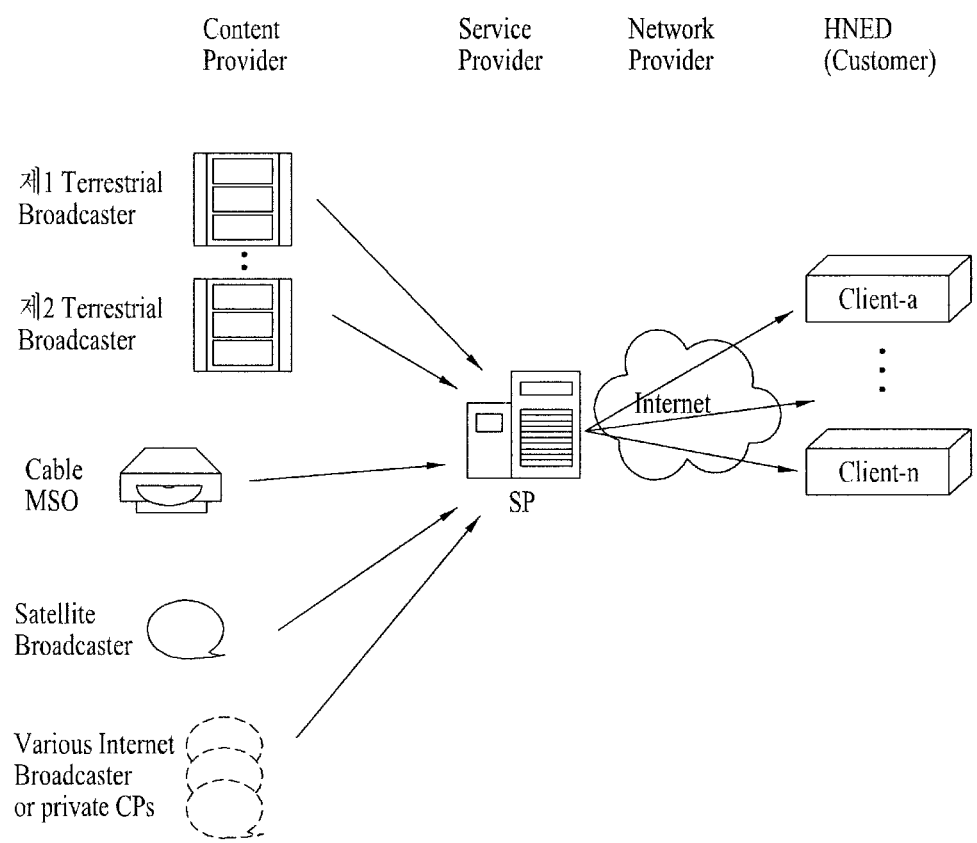
FIG. 1 is a diagram schematically illustrating an IPTV system according to an exemplary embodiment of the present invention.

Reference will now be made in detail to the specific embodiments of the present invention, examples of which are illustrated in the accompanying drawings. Wherever possible, the same reference numbers will be used throughout the drawings to refer to the same or like parts.

In reference to the accompanying drawings, a method for outputting content information and a display system according to the present invention will be described as follows.

Terminology used in the specification of the present invention may adapt common technical terminology that is well-known broadly in consideration of the functions of the present invention and it may be varied according to purpose or practices of people who pertains to the art. In a specific case, the applicant chooses terminology and such terminology is described in the description of the specific embodiments. As a result, the terms may be understood as the meaning based on the content of the description, not as the simple title.

An internet protocol TV (IPTV) system that is an example of systems capable of providing various contents via internet networks may be configured of a server, a network and a client.

The server of the IPTV may include servers employed for diverse functions such as a service discovery selection server, streaming server, content guide information server, and viewer information server.

The streaming server among those servers transmits video data encoded by MPEG2 (Moving Picture Expert Group 2) and MPEG4 to a user via a network. A protocol for the transmission may be a RTP (Real-Time Transport Protocol), RTCP (RTP Control Protocol).

In case of using RTSP, motion picture stream playing may be controllable by a network trick play function configured of pause, replay and stop. Such the protocols are examples represented by the present invention and other types of real-time transport protocols may be useable.

The content guide information server provides the user with information of diverse contents and the content guide information is corresponding to EPG (Electronic Program Guide) information including diverse information on the contents. The content guide information server stores guide information data therein and it transports the stored data to a receiver.

The service discovery selection server out of those servers transmits connection information and play information on the servers providing diverse content services including broadcasting, COD (Contents On Demand) and games to the receiver.

The network system is enabled based on an internet network and gateways. The internet based network may use an optical cable network, coaxial cable network, FTTH, telecommunication network, wireless network and the like based on IP. The gateway may perform conventional data transmission and it also may perform multicast group management and QoS (Quality of Service) management by using IGMP (Internet Group Management Protocol).

The receiver of the IPTV receives the data transmitted via the internet network and it transmits the received data to the user. The IPTV receiver may include an IPTV settop, homenet gateway and IPTV embedded TV.

In case of a hybrid type IPTV system, the user may be provided with various contents of Internet as well as conventional broadcasting contents may be provided. That is, data contents rather than various broadcasting contents such as the terrestrial, cable, satellite and personal broadcasting and various internet video contents. These contents may be provided in real-time or on demand according to the user's request.

FIG. 1 is a diagram schematically illustrating an IPTV system according to an exemplary embodiment of the present invention. In an aspect of the content service providing, the IPTV system may include a content provider (CP), a service provider (SP), a network provider (NP) and a user, as shown in FIG. 1.

The content provider (CP) produces and provides various contents and the CP may include a terrestrial broadcaster, a cable system operator (cable SO), a multiple system operator (MSO), a satellite broadcaster and an internet broadcaster.

The service provider (SP) service-packages the contents provided by the CP and it transmits the service-packaged contents. For example, the SP shown in FIG. 1 packages a first terrestrial broadcasting, a second terrestrial broadcasting, a cable MSO, a satellite broadcasting and various internet broadcastings and it provides the packaged broadcastings to the user.

Figure 2:
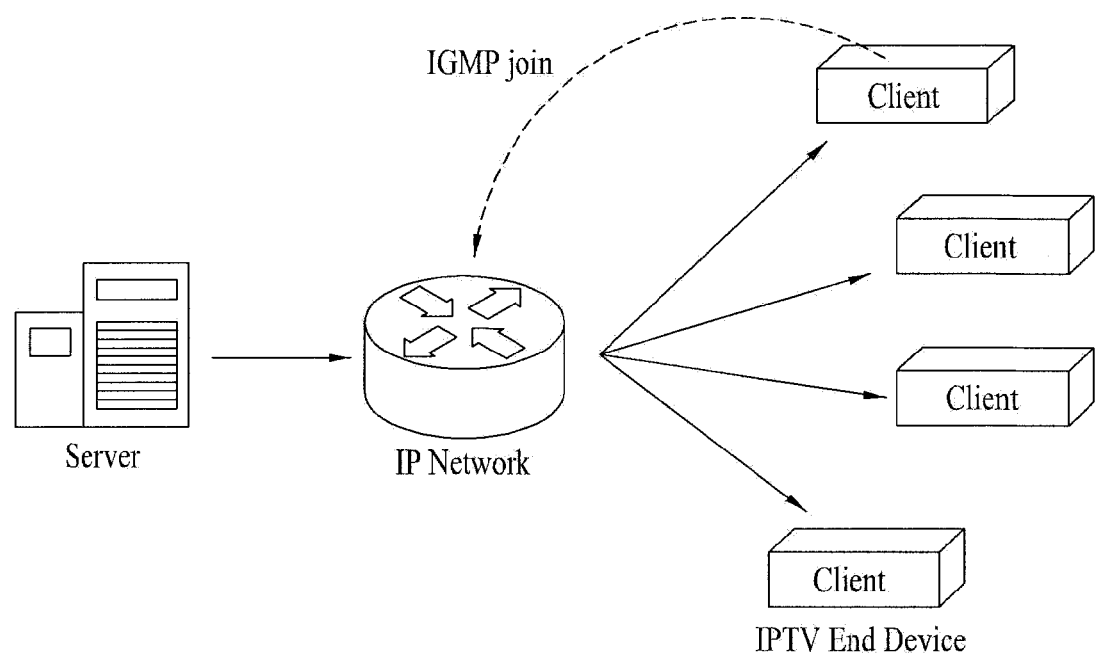
FIG. 2 is a diagrams schematically illustrating a multicast type and a unicast type, respectively.
Figure 2:
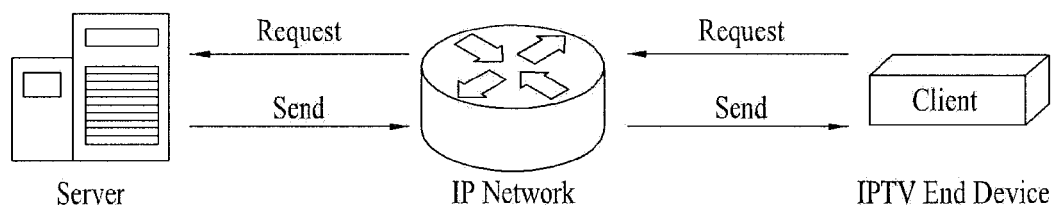

The SP provides the service with the user by using a unicast or multicast type. FIG. 2 is a diagram schematically illustrating the multicast and the unicast, respectively. The unicase type transmits data between a single transmitter and a single receiver by 1:1. For example, if data is requested to the receiver in the unicast type, the server transmits the data to the receiver. The multicast type transmits data to a group of receivers. For example, the server transmits the data to a plurality of pre-registered receivers simultaneously. An IGMP (Internet Group Management Protocol) may be used for the multicast registration.

The network provider (NP) provides a network for transmitting the service to the user. The user builds Home Network End User (HNED) to receive the service.

A conditional access, a content protection and the like may be used as means for protecting the contents transmitted by the IPTV system. An example of such the conditional access and content protection may be a cable card or DCAS (Downloadable Conditional Access System).

Figure 3:
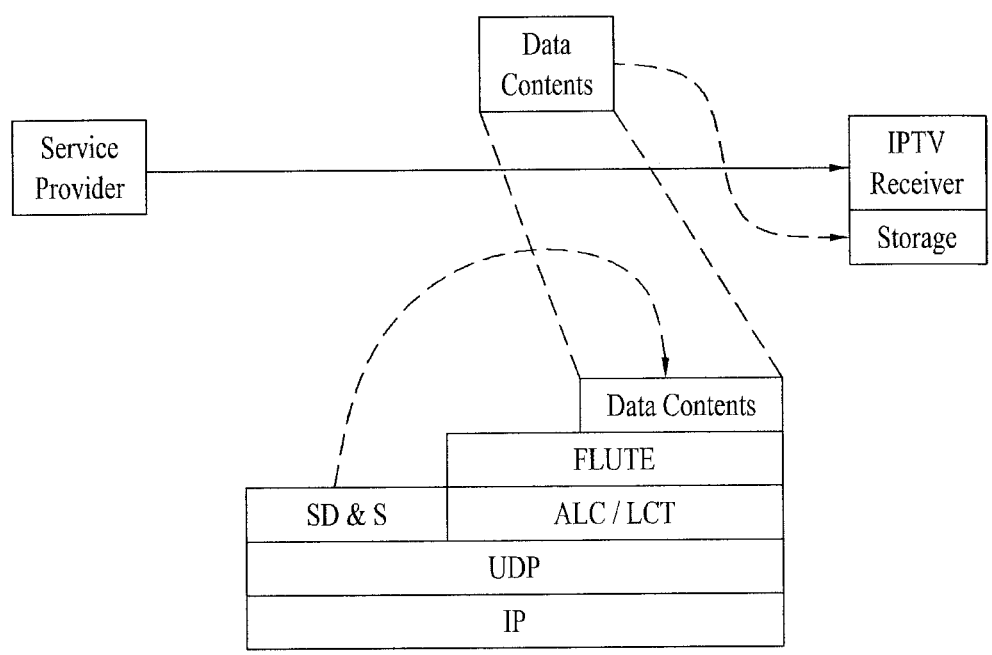
FIG. 3 is a diagram illustrating a layering structure for Content Download Service (CDS) of the IPTV.

FIG. 3 is a diagram illustrating a layering structure for CDS (Content Download Service) broadcasting of the IPTV.

In reference to FIG. 3, the SP transmits data contents for CDS to the IPTV receiver via a transport protocol. The transported data contents for CDS may be stored in a storage part of the IPTV. The stored data contents for CDS may be performed according to the user's request. Here, the transport protocol may be FLUTE (File Delivery over Unidi-rectional Transport) filed on ALC/LCT on IP/UDP and also it may be DVB-STP, DVB Data/Object carousel, FTP (File Transfer Protocol) and hypertect transfer protocol (HTTP). These protocols mentioned above may be examples represented by the present invention and other types of protocols may be usable.

In case FLUTE is used as transport protocol, it may be known to the IPTV receiver whether there is CDS service or not by SD&S (Service Discovery and Selection) and details of the contents may be discoverable via TV Anytime type metadata.

The data contents for CDS may include A/V contents, data contents, game contents and various kinds of contents.

Figure 4:
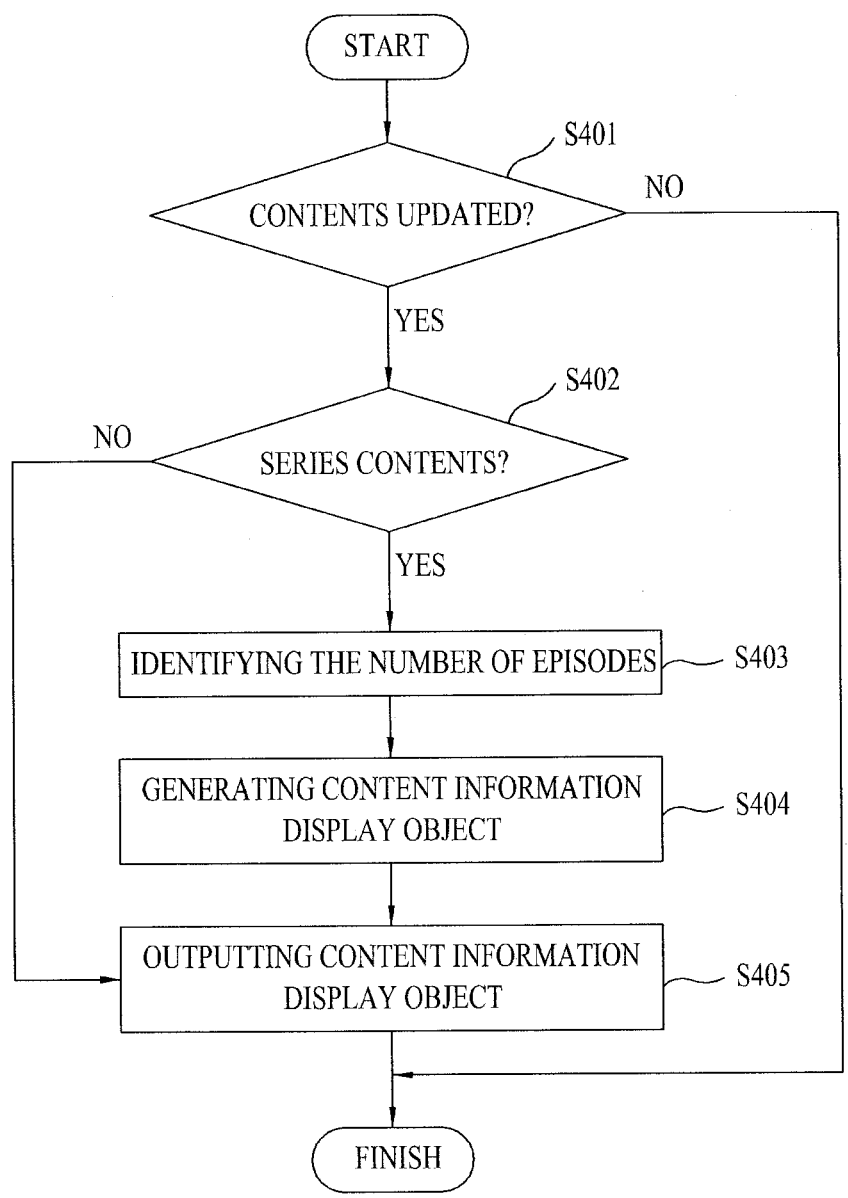
FIG. 4 is a diagram illustrating a process of displaying contents according to the present invention.

FIG. 4 is a diagram illustrating a process of outputting contents according to an exemplary embodiment of the present invention.

In reference to FIG. 4, a display system according to an exemplary embodiment of the present invention determines whether contents are updated (S401). If it is determined that the content are updated, it is determined whether the updated contents are a series of episodes or a single episode (S402). The display system according to the present invention may be the IPTV receiver mentioned above.

FIG. 4 shows that it is identified whether the contents of the updated information or updated message are the series of episodes or the single episode in case of contents are updated. Even in case contents or contents lists of a content database is outputted, not in case the contents are updated, the process shown in FIG. 4 may be performed.

Here, whether the contents are series (hereinafter, series contents) or a single episode (hereinafter, single contents) and the number of episodes including the contents may be identified by additional information of the contents.

For example, details of the contents may be defined in the TV Anytime type metadata as mentioned above or the additional information stored in PVR according to other embodiments. The display system determines whether the contents are a series of episodes or a single episode. If the contents are the series, the number of the entire episodes may be determined.

If the contents are series based on the result of the identification, the display system determines the number of the episodes of the contents (S403).

Hence, the display system generates a content information display object corresponding to the series contents (S404).

Here, the content information display object corresponding to the series contents may be distinguished from a content information display object corresponding to the single contents. The content information display object may be generated as 3-dimensional (3D) object.

The display system outputs the generated content information display object in a display screen (S405).

Figure 5:
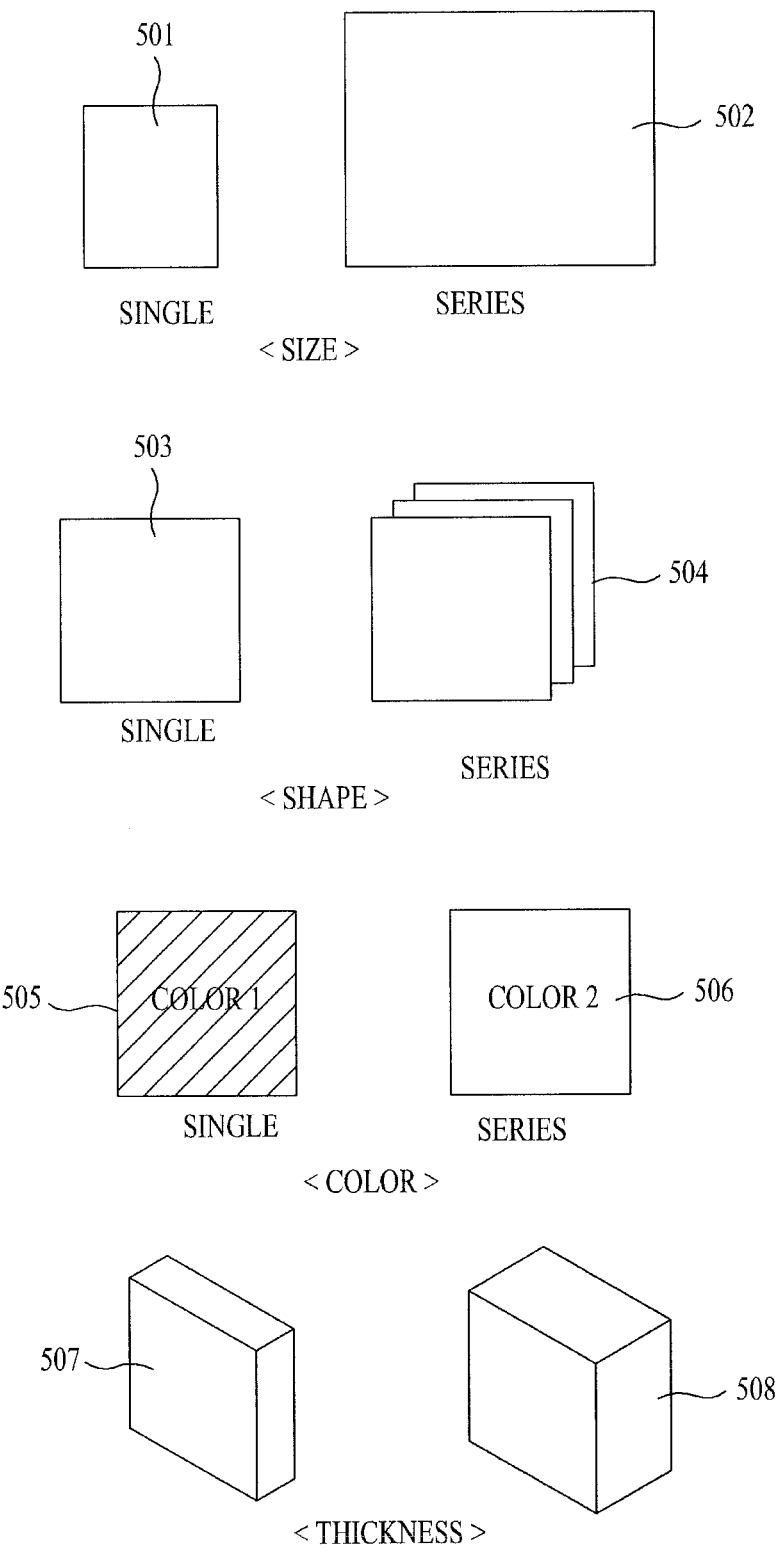
FIG. 5 is a diagram illustrating a content information display object according to an embodiment of the present invention.

FIG. 5 is a diagram illustrating an embodiment of the content information display object according to the present invention.

In reference to FIG. 5, the display system according to the present invention generates a content information display object corresponding to the series contents that is distinguished from a content information display object corresponding to the single content.

For example, the display system may display the content information display object corresponding to the series contents having a size, shape and color that is different from a size, shape and color of the single contents.

At this time, the display system may generate a content information display object corresponding to the number of the episodes included in the series contents and it may increase a region where the content information display object corresponding is outputted according to the determined number of the episodes. Here, an episode may be a content unit included in a single content of the series contents.

For example, the display system may increase the size or thickness of the content information display object according to the determined number of the episodes.

For example, if the determined number of the episodes is 'n' the display system may determine the thickness (D) of the content information display object as follows.

$$D=A+[B*(n-1)]$$

At this time, 'A' may be referenced to as a value of the thickness corresponding to a single one of the contents and 'B' may be referenced to as a constant of the series thickness. 'B' may be set differently according to embodiments.

Especially, if the content information display object is 3D object, the display system may increase the length or depth of a predetermined axis of the 3D object as the number of the episodes increases.

Figure 6:
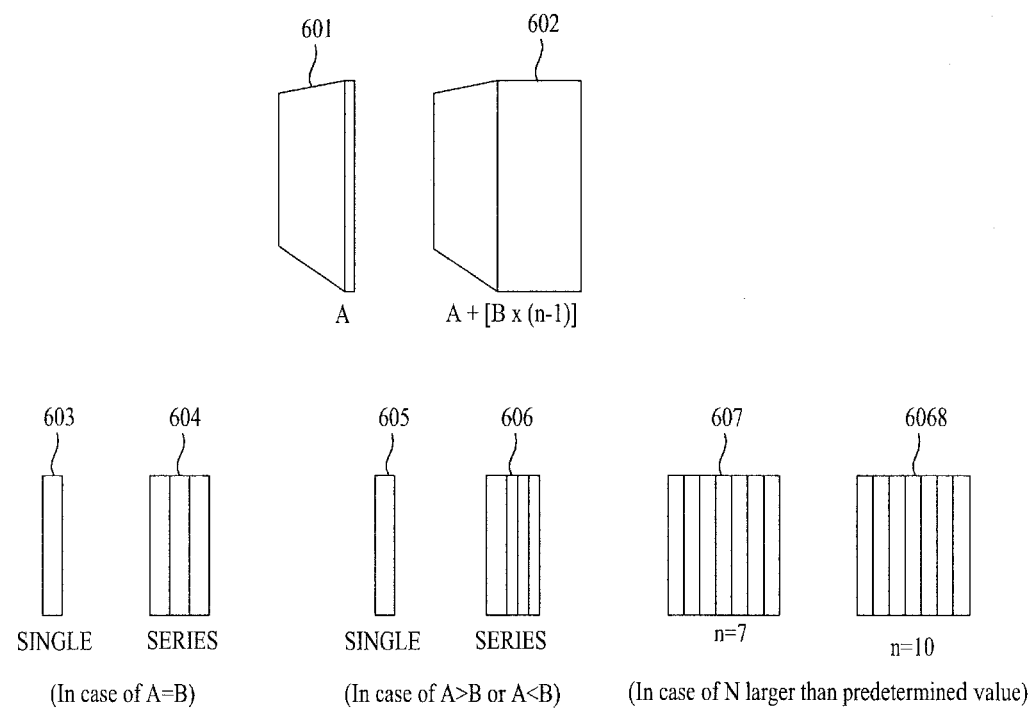
FIG. 6 is a diagram illustrating a process of adjusting the thickness of the content information display object diversely according to the present invention.

FIG. 6 is a diagram illustrating an embodiment of adjusting the thickness of the content information display object diversely according to the present invention.

In reference to FIG. 6, a display system according to this embodiment may set the thickness of the single contents 601 as 'A' and the thickness of the series contents as 'D=A+[B*(n−1)].

If it is set as A=B, a content information display object corresponding to the single contents may be a numeral reference 603 and a content information display object corresponding to the series contents may be a numeral reference 604. It may be set that the thickness of the content information display object increase according to the number of episodes.

In case of A>B or A<B, the content information display object corresponding to the single contents may be a numeral reference 605 and the content information display object corresponding to the series contents may be a numeral reference 606. It may be set that a region that is the size or thickness of the content information display object increase according to the number of episodes.

If the region is increased continuously according to too many numbers of the episodes, it is impossible to output the entire content information display object in an output screen. Because of that, if the number of the episodes 'n' is larger than a threshold value, the region of the content information display object may be determined as a predetermined maximum value.

Figure 7:
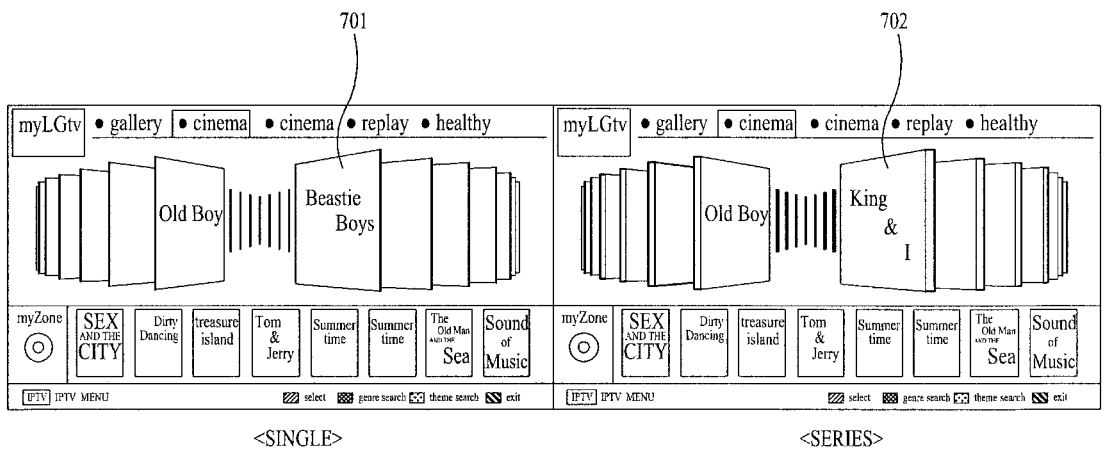
FIG. 7 is a diagram illustrating a single content and series contents set to have different thicknesses according to the present invention.

FIG. 7 is a diagram illustrating an embodiment setting the thicknesses of the single contents and the series contents different from each other.

In reference to FIG. 7, the display system according to the present invention adjusts the thickness 701 of the single contents and the thickness 702 of the series contents to be different from each other, such that the user may be allowed to determine whether the contents are the single or series on a user interface.

Figure 8:
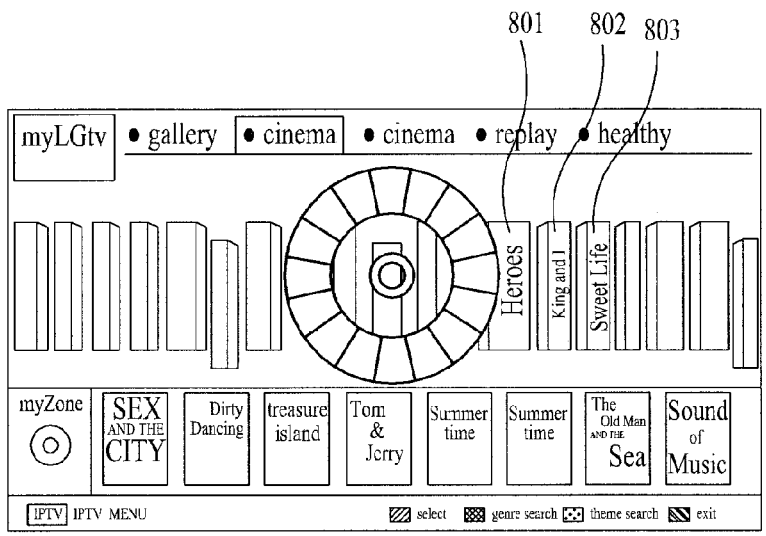
FIG. 8 is a diagram illustrating series contents set to have diverse thicknesses according to the present invention.

FIG. 8 is a diagram illustrating an embodiment setting the thickness of the series contents diverse.

In reference to FIG. 8, after identifying the number of the series contents, the display system according to the present invention adjusts and outputs the thickness of the content information display objects 801, 802 and 803 according to the determined number of the series contents. As a result, the user may determine whether to output the contents in reference to the thickness of the series.

For example, after comparing the thickness of "Heroes" 801, "King and I" 802 and "A bittersweet life" 803, the user may select and output the contents to view all of the series in consideration of his/her spare time As a result, when outputting the content information display object of the series contents, the display system according to the present invention displays the content information display object distinguished from the content information display object of the single contents and thus the user may distinguish the single contents and the series contents efficiently advantageously.

Moreover, the thickness of the content information display object corresponding to the series contents may be applicable diversely, the user is allowed to perceive the interface of the display system like real life such that the user may use the interface more conveniently.

Figure 9:
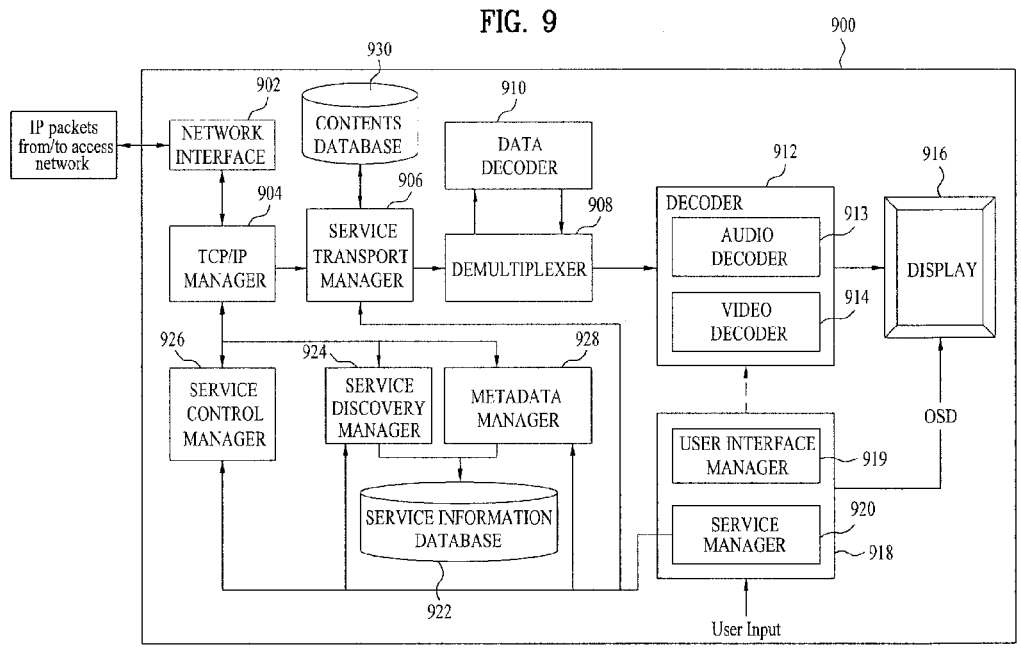
FIG. 9 is a block view illustrating an IPTV receiver according to an exemplary embodiment of the present invention.

FIG. 9 is a block view illustrating a display system according to an exemplary embodiment of the present invention.

In reference to FIG. 9, the display system according to the exemplary embodiment of the present invention may be an IPTV receiver 900 and the IPTV 900 may include an auxiliary tuber to receive a terrestrial, cable and satellite broadcasting. However, a configuration for processing contents transported via an internet network in the IPTV 900 according to the present invention will be described for explanation convenience.

The IPTV 900 includes a network interface 902, a TCP/IP manager 904, a service transport manager 906, a demultiplexer 908, a data decoder 901, a decoder 912, a display 916, a controller 918, a service information database 922, a service discovery manager 924, a service control manager 926, a metadata manager 928 and a contents database 930.

The network interface 902 receives packets received from the network and it transmits the packets to the network. That is, the network interface 902 receives contents and an update message from broadcasting providers.

The TCP/IP manager 904 manages the packet transmission from a source to a destination of the packets transmitted from the IPTV receiver 900. The TCP/IP manager 904 categorizes the received packets, corresponding to proper protocols and it outputs the categorized packets to the service transport manager 906, the service discovery manager 924, the service control manager 926 and the metadata manager 928.

For example, in case of receiving update information or update information of contents, the TCP/IP manager 904 may output the received updated information or the updated message to the service control manager 926.

The service transport manager 906 controls the received service data. For example, in case of controlling real-time streaming data, RTP/RTCP (Real Time Transport Protocol/ RTP Control Protocol) may be used. If transmitting the real-time streaming data by using RTP, the service transport manager 906 parses the received data packet according to RTP and it transmits the parsed data packet to the demultiplexer 908 or stores the parsed data packet in the content database 930 according to the control of the service manager 920. Then, the service transport manager 906 feedbacks the network received information to a service providing server by using RTCP.

The demultiplexer 908 demultiplexes the received packets into video, PSI (Program Specific Information) data and it transmits the demultiplexed data to the data decoder 910.

The data decoder 910 decodes service information such as PSI. That is, the data decoder 910 receives and decodes PSI section, PSIP (Program and Service Information Protocol) section or DVB-SI section.

Also, the data decoder 910 decodes the received sections and it creates database relating to service information. Here, the data decoder 910 stores the database relating to the service information in the database 922.

The decoder 912 decodes the received video and audio data received from the demultiplexer 908. For that, the decoder 912 includes an audio decoder 913 and a video decoder 904. The audio decoder 913 decodes audio data and it provides the decoded audio data with the user via a speaker (not shown). The video decoder 904 decodes video data and it provides the decoded video data with the user via the display 916.

The controller 918 manages an overall state of the IPTV receiver 900 and it provides a user interface with the user. In addition, the controller 918 controls the other managers. For that, the controller 918 includes a user interface manager 919 and a service manager 920.

The user interface manager 919 provides GUI (Graphic User Interface) with the user by using OSD (On Screen Display) and it performs operation of the receiver according to a key signal inputted by the user.

For example, once receiving key input for channel selection from the user, the user interface manager 919 transmits the key input signal to the service manager 920.

The controller 918 determined whether the contents are series or single. If it is determined that the contents are series, the controller 918 generates a content information display object corresponding to the series contents. Here, the content information display object corresponding to the series contents may be distinguished from a content information display object corresponding to the single contents as mentioned above.

If it is determined that the contents are series, the controller 918 identifies the number of the episodes and it generates a content information display object corresponding to the identified number of the episodes.

The controller 918 may changes a region of the content information display object corresponding to the identified number of the episodes.

For example, if the identified number of the episodes is 'n' the controller 918 determines the thickness (D) of the content information display object to be d=A+[B*(n−1)]. Here, 'A' may be referenced to as a value of the thickness corresponding to one of the contents and 'B' may be referenced to as a constant value corresponding to the thickness of the series.

At this time, if the identified number of the episodes is larger than a threshold value, the controller 918 determines the region of the content information display object to be a predetermined maximum.

The content information display object may be generated as 3D object as mentioned above and the length or depth of a predetermined axis of the content information display object may be changeable according to the identified number of the episodes.

The controller 918 determines whether predetermined contents are series or single. If it is determined that the contents are series, the controller 918 may generate the content information display object corresponding to the series contents.

The display 916 outputs the content information display object in a display screen.

The service manager 920 controls managers relating to services such as the service transport manager 906, the service discovery manager 924, the service control manager 926, the metadata manger 928 and the IG-OITF client.

Also, the service manager 920 creates a channel map and it selects a channel by the channel map according to a key input received from the interface manager 919. The service manager 920 receives service information of the selected channel from the data decoder 910 and it sets audio/video PID (Packet Identifier) in the demultiplexer 908.

The service discovery manager 924 provides information required to select a service provider. If receiving a signal relating to channel selection from the service manager 920, the service discovery manager 924 searches a corresponding service by using the information.

The service control manager 926 is employed for selection and control of service. For example, if the user selects a live broadcasting service similar to the conventional broadcasting, the service control manager 926 uses IGMP or RTSP. If the user selects a VOD (Video On Demand) service, the service control manager 926 performs the selection and control of the service by using RTSP. The RTSP protocol may provide a trick mode for the real-time streaming.

The service control manager 926 initiates and manages a session for IMC gateway by using IMS (IP Multimedia Subsystem) and SIP (Session Initiation Protocol). The protocols are examples according to this embodiment and other protocols may be useable according to other embodiments.

The metadata manager 928 manages metadata relating to service and it stores the metadata in the service information database 922.

The service information database 922 stores the service information decoded by the data decoder 910, the metadata managed by the metadata manager 928 and the information required to select the service provider provided by the service discovery manager 924. The service information database 922 stores setup data for the system.

The service information database 922 and the content database 930 may be nonvolatile RAMs (NVRAM) or flash memories, respectively, and they may be embodied as two regions separated logically in a single storage region The content database 930 stores the contents controlled by a RVR manager (not shown). The RVR manager collects metadata relating to the stored contents and it generates additional information utilized for user convenience.

The display system according to the present invention is described so far and technical features mentioned in the above embodiments may be applicable to the display system shown in FIG. 9 and detailed description of the technical features will be omitted accordingly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for outputting a content information of a display system comprising:
   receiving at least one content having metadata;
   identifying whether the received content corresponds to a series of content or a single content based on the metadata;
   determining a number of episodes included in the series of content if the identified content corresponds to the series of content;
   generating, using a processor, a content information display object, wherein the content information display object has a variable thickness depending on the determined number of episodes in the series of content; and
   outputting a first thickness corresponding to a first object in a first region of a display screen, wherein the first region of the display screen is changed according to the determined number of episodes; and
   outputting a second thickness corresponding to a second object in a second region of the display screen, wherein the second thickness is different from the first thickness,
   wherein the outputting the first thickness corresponding to the first object in the first region of the display screen includes:
   if the determined number of episodes in the series of content is n, the first thickness (D) of the first object is as follows $D=A+[B*(n-1)]$ wherein A is a value of thickness corresponding to a single content and B is a constant of thickness corresponding to series contents.

2. The method of claim 1, wherein the outputting the second thickness corresponding to the second object in the second region of the display screen includes changing the second region of the display screen according to the determined number of episodes.

3. The method of claim 2, wherein the outputting the second thickness corresponding to the second object in the second region of the display screen includes:
   if the determined number of episodes is n, the second thickness (D) of the second object is as follows $D=A+[B*(n-1)]$ wherein A is a value of thickness corresponding to a single content and B is a constant of thickness corresponding to series contents.

4. The method of claim 1, wherein the content is received via an internet.

5. The method of claim 1, wherein identifying whether the received content corresponds to the series of content or the single content based on the metadata is performed if update information of the content is received.

6. A display apparatus comprising:
   a network interface receiving at least one content having metadata;
   a controller identifying whether received content corresponds to a series of content or a single content based on the metadata and determining a number of episodes included in the series of content if the identified content corresponds to the series of content, the controller generating a content information display object, wherein the content information display object has a variable thickness according to the number of episodes; and
   a display outputting a first thickness corresponding to a first object in a first region of a display screen, wherein the first region of a display screen is changed according to the determined number of episodes, and a second thickness corresponding to a second object in a second region of the display screen, wherein the second thickness is different from the first thickness,
   wherein the output of the first thickness corresponding to the first object in the first region of the display screen includes:
   if the determined number of episodes in the series content is n, the first thickness (D) of the first object is as follows $D=A+[B*(n-1)]$ wherein A is a value of thickness corresponding to a single content and B is a constant of thickness corresponding to series contents.

7. The display apparatus of claim 6, wherein the controller changes the second region of the display screen according to the determined the number of episodes.

8. The display apparatus of claim 7, wherein the controller changes the second region of the display screen according to a predetermined maximum value if the determined total number of the episodes is larger than a threshold value.

9. The display apparatus of claim 6, wherein the content is received via an internet.

10. The display apparatus of claim 6, wherein the controller identifies whether the received content corresponds to the series of content or the single content based on the metadata, if update information of the content is received.

* * * * *